US012272214B2

(12) United States Patent
Choi

(10) Patent No.: US 12,272,214 B2
(45) Date of Patent: Apr. 8, 2025

(54) SYSTEM AND METHOD FOR PROVIDING A TABLE-BASED CARD GAME SERVICE

(71) Applicant: Moonkwon Choi, Yongin-si (KR)

(72) Inventor: Moonkwon Choi, Yongin-si (KR)

( * ) Notice: Subject to any disclaimer, the term of this patent is extended or adjusted under 35 U.S.C. 154(b) by 366 days.

(21) Appl. No.: 18/092,343

(22) Filed: Jan. 2, 2023

(65) Prior Publication Data

US 2023/0230457 A1 Jul. 20, 2023

(30) Foreign Application Priority Data

Jan. 5, 2022 (KR) ........................ 10-2022-0001370

(51) Int. Cl.
*G07F 17/32* (2006.01)

(52) U.S. Cl.
CPC ........ *G07F 17/3293* (2013.01); *G07F 17/323* (2013.01); *G07F 17/3248* (2013.01)

(58) Field of Classification Search
CPC ............... G07F 17/3293; G07F 17/323; G07F 17/3248; G07F 17/3225; G07F 17/3288
USPC ................................................ 463/13, 12, 11
See application file for complete search history.

(56) References Cited

U.S. PATENT DOCUMENTS

2010/0113120 A1* 5/2010 Snow ...................... G07F 17/32 463/16
2010/0311488 A1* 12/2010 Miller ....................... A63F 1/12 463/31
2010/0311489 A1* 12/2010 Miller ....................... A63F 1/12 463/31
2010/0311490 A1* 12/2010 Miller ................. G07F 17/3293 463/16
2010/0311494 A1* 12/2010 Miller ....................... A63F 1/18 463/22
2010/0311502 A1* 12/2010 Miller ....................... A63F 1/02 463/30

FOREIGN PATENT DOCUMENTS

KR 10-2005-0056110 A 6/2005
KR 10-2012-0021502 A 3/2012

* cited by examiner

*Primary Examiner* — Pierre E Elisca
(74) *Attorney, Agent, or Firm* — Revolution IP, PLLC

(57) ABSTRACT

A system for providing a table-based card game service according to the present invention includes a controller that controls overall functions of the game comprising game start, preparation and end; a user information storage portion that stores user game information for each of a plurality of users registered to receive the card game service; and a game progressing portion that actually executes the card game in the game room generated in the controller and provides information related to game progressing to the controller.

6 Claims, 10 Drawing Sheets

SYSTEM AND METHOD FOR PROVIDING A TABLE-BASED CARD GAME SERVICE

TECHNICAL FIELD

The present invention relates to a system and method for providing a table-based card game service and, in particular, to a system and method for providing a table-based card game service in which in a win or loss method using the numbers or patterns of cards provided by a computer or any terminal, a four-round game is played through a single process that a player selects a betting target and bets game chips, and the dealer shuffles and arranges cards, and the odds for each round are applied differently to play the game.

BACKGROUND ART

Representative table-based card games may include baccarat, blackjack, and poker currently running in casinos.

Among them, a baccarat game is a simple game in which one only needs to guess whether the banker or the player will win from the cards presented by the dealer, and many people may enjoy the game without knowing the difficult game rules. Such a baccarat game may be played by entering a casino and directly participating in the game, or enjoyed indirectly by using a developed game system as disclosed in Korean Laid-open Patent Publication No. 2005-0056110 (Publication Date: Jun. 14, 2005) and Korean Laid-Open Patent Publication No. 2012-0021502 (Publication Date: Mar. 9, 2012).

In the case of a table-based card game, the dealer is in charge of proceeding with the game by dealing cards according to predetermined rules, and win or loss is determined according to the game rules. At this time, the player selects a betting target before the cards are dealt and places a bet with game chips, and, depending on the game, additional bets may be placed based on the result of the dealt card.

Although played face-to-face, such a table-based card game may also be played in cyberspace by the recent development of network technology. That is, after accessing a card game service system using a computer or a smart terminal, a random player A may play a card game with a virtual game partner provided by the system or any other user B accessing to the system.

On the other hand, while the type and number of cards vary depending on the type of game and the game rules also vary accordingly, such a card game has an advantage that the game rules are relatively simple so as to be easily played by anyone, regardless of gender or age.

However, even in the case of a simple baccarat game, the rules set for the game method are various, and the boxes displayed on the game table to bet game chips are configured to be complex. For this reason, there is a problem that it may take a while for a player new to the game to be able to participate in the game.

In addition, since simple and repetitive game rules are applied to the existing card games so as to be easily played by people of all ages and gender, such games have a disadvantage that, when played repeatedly for a long time, they may make the players loss interest in the games and cause boredom.

Accordingly, there is a demand for developing a table-based card game to which simple game rules that are not complicated are applied and elements that may induce enjoyment and interest are added even when such a game is played repeatedly.

SUMMARY OF INVENTION

Technical Problem

The present invention has been devised to solve the above-described problems, and an object of the present invention is to provide a system and method for providing a table-based card game service by win or loss method using the numbers or patterns of cards, wherein a four-round game is played through a single process that a player selects a betting target and bets game chips, and the dealer shuffles and arranges cards, and, as the successive rounds of the game progress, the player can be rewarded with higher odds as the round progresses.

Another object of the present invention is to provide a system and method for providing a table-based card game service that enables players new to the game to participate in the game by using simple game rules.

The objects of the present invention are not limited to those described above, and other objects and advantages not described above may be understood by the following description and may be more clearly understood through the embodiments of the present invention. It is also apparent that the objects and advantages of the present invention may be realized by means and a combination thereof described in the scope of claims.

Solution to Problem

The system for providing a table-based card game service according to the present invention for achieving the above-described objects may comprise the following: a controller that controls overall functions of the game comprising game start, preparation and end; a user information storage portion that stores user game information for each of a plurality of users registered to receive the card game service; and a game progressing portion that actually executes the card game in the game space (game room) generated in the controller and provides information related to game progressing to the controller, wherein the game progressing portion comprises a game controller that performs control functions required to perform the card game, e.g., generating a player's betting amount and betting position, determining win or loss, and awarding a prize corresponding to odds for each round and option betting, when the card game is played among a plurality of players; a game information providing portion that provides the function of transmitting game information that needs to be delivered to the player (e.g., information on numbers, symbols or patterns of cards opened in each round, betting amounts and positions of players, win or loss, odds and prize amounts for each round and option betting); a card analysis portion that compares the open card hands placed for each round on a pair of a red side and a blue side on which four zones from the 1st round to the 4th round of the card placement zone are sequentially drawn, and judges the win or loss between the red side and blue side through the predetermined value ranking of the card hands and, after the end of the game up to the 4th round, checks whether or not all four open card hands placed on each side in the card placement zone are the same to determine the win or loss of the option of each side; an odds calculation portion that calculates the award amount by applying the odds to the amount bet on the winning side determined by the card analysis portion based on the odds preset for each round, and calculates the award amount by applying the odds to the amount bet on the winning option based on the odds preset for the option betting; and a compensation processing portion that rewards players who bet on the winning side and winning option by using the award amount calculated by the odds calculation portion.

Preferably, the card analysis portion may comprise sequentially comparing cards placed on the red side and blue side of the card placement zone for every round to determine win or loss.

After the end of the game up to 4th round, the card analysis portion may determine that, if all four open card hands placed on each side of the card placement zone are the same, the option of the corresponding side is win, and, if any one of the four open card hands placed on each side is different from others, the option of the corresponding side is loss.

Preferably, the odds calculation portion is characterized in that rewards are given in win or loss method using the numbers or patterns of cards, and the odds increase gradually towards the later rounds.

Preferably, the compensation processing portion is characterized in that all game chips bet on all subsequent rounds including the losing round are collected from a player who bet on the losing side in the corresponding round of the game.

The method for providing the table-based card game service according to the present invention for achieving the above-described objects may comprise the following steps: (A) providing the game information to the user terminals of the players through the game information providing portion when the card game is performed by the game controller; (B) providing, by the game information providing portion, a betting zone comprising a pair of a red side and a blue side on which four zones from round 1 to round 4 and an option zone on top (i.e., top of round 4) are sequentially drawn, to players connected to the management server, and betting game chips on either the red side or blue side of the betting zone and selecting the option of each side to bet the game chips; (C) placing, by the game controller, one different card with the back side of the card facing up on each of the red side and blue side of a card placement zone on which four zones from round 1 to round 4 are sequentially drawn; (D) opening, by the card analyst portion, the cards placed on round 1 of each of the red side and blue side of the card placement zone, comparing the numbers or symbols displayed on the open cards to determine win or loss between the red side and blue side through a predetermined value ranking of the card hands; and, after the end of the game up to round 4, and checking whether or not all four open card hands placed on each side of the card placement zone are the same to determine win or loss of the option of each side; (E) calculating, by the odds calculation portion, an award amount by applying the odds preset for each round corresponding to the amount bet on the round determined as win, and calculating an award amount by applying the odds preset for the option betting corresponding to the amount bet on the option determined as win; (F) awarding, by the compensation processing portion, a player who bet on the winning side by using the calculated award amount; (G) playing, through the game controller, the card game based on the presence or absence of the game chips in the betting zone (based on whether or not the betting is made), and sequentially comparing, through the card analyst portion, the cards placed on the red side and blue side of the card placement zone for every round to determine win or loss; and (H) determining the win or loss of the red side and blue side of the betting zone according to the results of determination in step (G) and repeating steps (E) and (F).

Preferably, the odds are applied differently for each round and increase gradually towards the later rounds.

Preferably, step (F) comprises the steps of rewarding a player who bet on the winning side in the round, and, if the red side and blue side are a draw in the round, returning the amount bet on the round to the player; and collecting all game chips bet in all subsequent rounds including the losing round from a player who bet on the losing side in the round; and rewarding a player who bet on the winning option and collecting the betting chips from a player who bet on the losing option.

Advantageous Effects of Invention

As described above, the system and method for providing the table-based card game service according to the present invention produce the following effects.

First, betting is made in win or loss method using the numbers or patterns of the cards, and the odds for each round are differently applied to proceed with the game.

Second, simple game rules are used such that players of all ages as well as players who are new to the game may easily participate in the game.

Third, a four-round game may be played through a single process that a player selects a betting target and bets game chips, and the dealer shuffles and arranges cards, such that the game may be played quickly in a row. That is, the player may quickly play many games in a short period of time and, thus, may feel fun and interesting.

In addition to the effects described above, detailed effects of the present invention will be described together with the detailed description for implementing the present invention.

MODE FOR INVENTION

Figure 1:
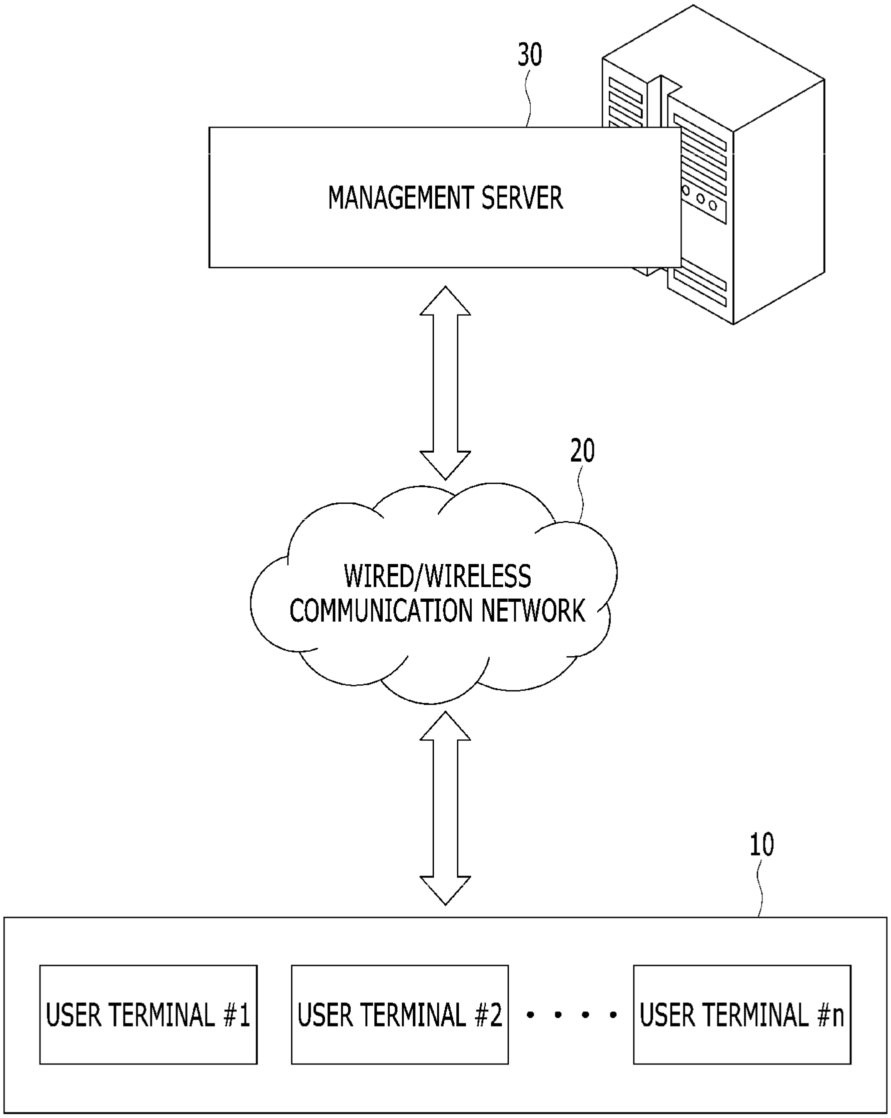
FIG. 1 is a conceptual diagram explaining a system for providing a table-based card game service according to an embodiment of the present invention.

Other objects, characteristics and advantages of the present invention will be apparent through the detailed description of the embodiments with reference to the drawings as attached.

The terms used in the present invention have been selected from general terms that are currently widely used as much as possible, while considering the functions in the present invention. However, the terms may vary depending on the intention of a person skilled in the art, precedents, emergence of new technologies, etc. In addition, in certain cases, there are terms arbitrarily selected by the applicant, and, in such case, the meaning will be described in detail in the relevant description of the present invention. Therefore, the terms used in the present invention should be defined based on the meaning of the term and the overall contents of the present invention, rather than simply on the names of the terms.

When the specification of the present invention describes "comprising" a certain component, it means that it may further comprise other components, not excluding other components unless otherwise described. In addition, terms such as "portion" and "module" described in the specification refer to a unit that processes at least one function or operation, which may be implemented by a hardware or a software or a combination of a hardware and a software.

A preferred embodiment of a system and method for providing a table-based card game service according to the present invention will be described with reference to the attached drawings. However, the present invention is not limited to the embodiments disclosed below and may be implemented in various forms, and the embodiments of the present invention are provided to complete the disclosure of the present invention and fully inform those skilled in the art of the scope of the invention. As such, the embodiments described in the specification of the present invention and the features shown in the drawings are merely one of the most preferred embodiments of the present invention and do not represent all of the technical ideas of the present invention. Therefore, it should be understood that there may be various equivalents and modifications that may replace them at the time of the filing date of the present application.

Hereinafter, when the specification of the present invention describes that a component is "linked", "coupled" or "connected" to another component, such components may be directly linked or connected to each other, but it should be understood that another component may be "interposed" between the components, or the components may be "linked," "coupled" or "connected" to each other through another component.

FIG. 1 is a conceptual diagram illustrating the system for providing the table-based card game service according to an embodiment of the present invention.

As shown in FIG. 1, the system for providing the card game service of the present invention may comprise a management server 30 connected to a plurality of user terminals 10 through a wired/wireless communication network 20 to provide card game services to the user terminals 10.

A card game program (e.g., a web and an app) provided by the management server 30 may be installed on each of the user terminals 10, and then the management server 30 is accessed through the card game program to play a card game. Here, each of the user terminals 10 may be a computer system such as a desktop and a laptop, or a smart terminal such as a smartphone and a tablet PC.

The user terminals 10 may communicate with other user terminals 10 and/or the management server 30 through the wired/wireless communication network 20 by using a wireless or wired communication method.

The communication method is not limited to those mentioned above and may comprise short-range wireless communication between devices as well as a communication method using a communication network (e.g., a mobile network, a wired Internet, a wireless Internet and a broadcasting network) that may be contained in the wired/wireless network 20. For example, a wired/wireless network 20 may comprise any one or more networks among a personal area network (PAN), a local area network (LAN), a campus area network (CAN), a metropolitan area network (MAN), a wide area network (WAN), a broadband network (BPN), the Internet, etc. In addition, the wired/wireless network 20 may comprise, but is not limited to, any one or more network topologies among a bus network, a star network, a ring network, a mesh network, a star-bus network, a tree or a hierarchical network, etc.

Each of the management servers 30 may be implemented as a computer device or multiple computer devices that provide commands, codes, files, contents, services, etc. by communicating with the user terminals 10 through the wired/wireless communication network 20.

The management server 30 has the same configuration as a conventional web server in terms of hardware and comprises a program module implemented through various forms of languages (e.g., C, C++, Java, Visual Basic and Visual C) to have various functions in terms of software.

Figure 2:
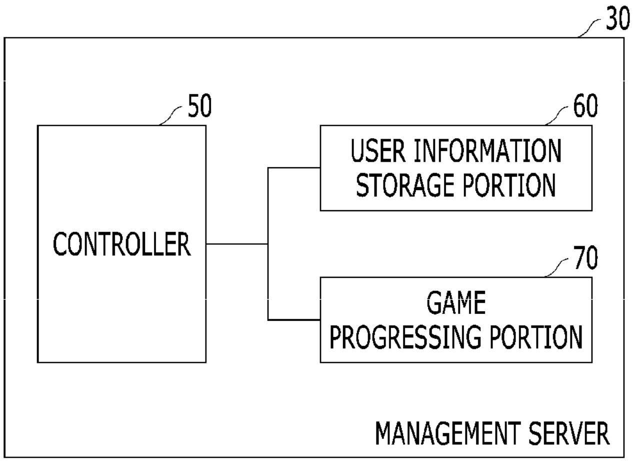
FIG. 2 is a block diagram illustrating the configuration of the management server in FIG. 1 in detail.

FIG. 2 is a block diagram illustrating the configuration of the management server in FIG. 1 in detail.

As shown in FIG. 2, the management server 30 may comprise a controller 50, a user information storage portion 60 and a game progressing portion 70. In this case, the controller 50, the user information storage portion 60 and the game progressing portion 70 may be physically separated computer systems, respectively or internally separated programs within at least one computer system.

The controller 50 performs overall game functions of a game such as game start, preparation and end and may control the user information storage portion 60 and the game progressing portion 70, respectively.

The user information storage portion 60 stores user game information for each of a plurality of users registered to receive a card game service from the management server 30. In this case, the controller 50 may control the user information storage portion 0 to receive necessary information among the user game information, update the user game information or add the user game information of a newly registered user.

The game progressing portion 70 may actually execute a card game in the game space (game room) generated by the controller 50 and provide information related to game processing to the controller 50. Here, the game progressing portion 70 may be separate from the controller 50 or may be contained in or integrated with the controller 50 to perform functions.

Figure 3:
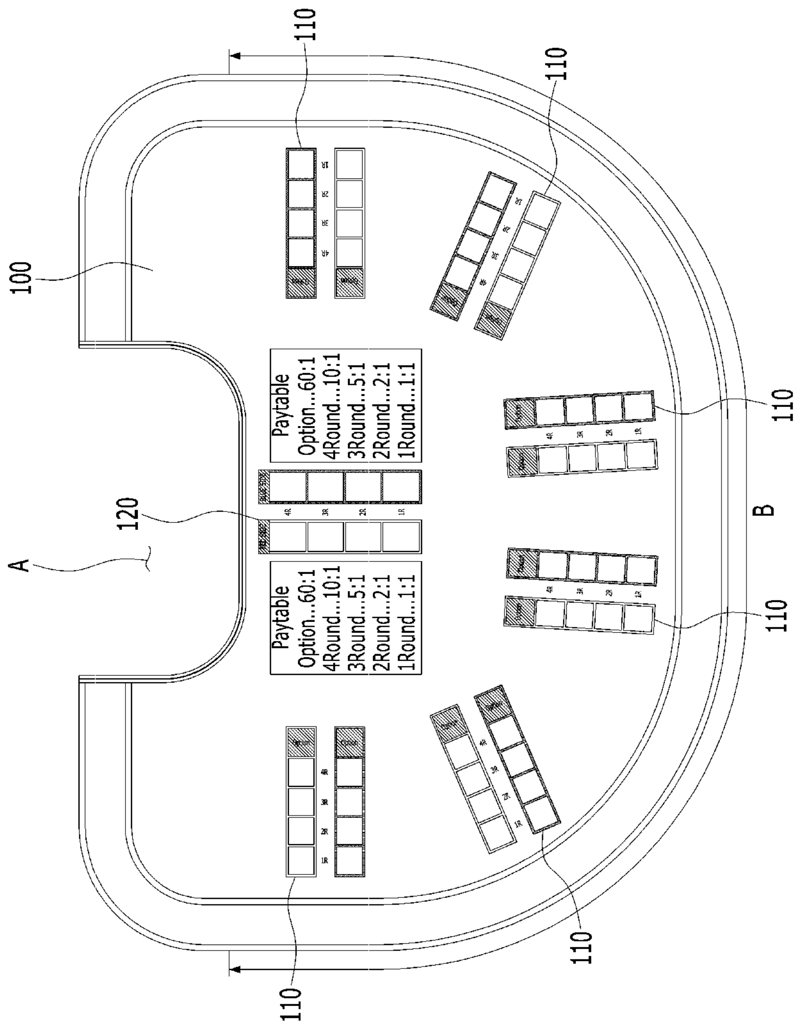
FIG. 3 is a plan view illustrating the structure of a table for a card game according to an embodiment of the present invention.

FIG. 3 is a plan view showing the structure of a card game table according to an embodiment of the present invention, wherein the game progressing portion 70 may have, on a game table 100, a game pad on which a layout comprising a betting zone 110 and a card placement zone 120 necessary for playing a card game is implemented. In this case, the betting zone 110 is an area in which a player places game chips for betting during the card game, and the card placement zone 120 is an area in which the dealer places a card to proceed with the card game. Accordingly, the size of the card placement zone 120 where the cards are placed may be formed in a layout wider than the betting zone 110 where the game chips are placed. Also, the card placement zone 120 may be formed adjacent to the dealer position zone (A) so that the cards may be easily placed by the dealer, and the betting zone 110 may be formed adjacent to the game player position zones (B) such that the players may easily place the game chips for betting.

The betting zone 110 may be positioned in each of a plurality of game player position zones (B). Additionally, the betting zone 110 may comprise a layout consisting of four zones from round 1 to round 4, and a pair of a red side and a blue side with option zones sequentially drawn on the top (top of round 4).

The option zone is an area in which a player may select and bet game chips for an option game in which additional betting may be made separately from the game of rounds consisting of round 1 to round 4 during the card game.

Meanwhile, the card placement zone 120 may be positioned in the dealer position zone (A). The card placement zone 120 may comprise a layout consisting of a pair of a red side and a blue side on which four zones from round 1 to round 4 are sequentially drawn.

In the card placement zone 120, eight cards are collectively placed on the red side and blue side, and each card placed on the red and blue sides may be flipped for each round to compare the numbers or symbols (i.e., patterns) displayed on the cards and determine win or loss between the red and the blue sides through a predetermined value ranking of the card hands. For example, in the case of numbers, the side having a card with a higher number may be determined to be a win and the side having a card with a lower number may be determined to be a loss as a result of the comparison. In addition, in the case of a standard playing card, in the order of ♠>♦>♥>♣, the side having a card with a higher ordered pattern may be determined to be a win and the side having a card with a lower ordered pattern may be determined to be a loss. In this case, the cards to be used may be a standard playing card with a number and a symbol displayed on one side, but the present invention is not limited thereto, and any cards comprising four types of card hands that may be compared to determine win or loss may be used.

Game chips are awarded to the player who wins as a result of comparing cards positioned on the red and blue sides of the card placement zone 120, based on the betting amount of the round, and all game chips in all subsequent rounds including the losing round (all game chips bet in the betting zone 110) are collected from the losing player.

In such case, the game progressing portion 70 allows betting to be made in win or loss method using the numbers or patterns of the cards, and may proceed with the game by applying different odds for each round to award dividends according to the odds.

The odds may the odds increase gradually towards the later rounds. For example, in round 1, the odds are 1 time the betting amount, in round 2, the odds are 2 times the betting amount, in round 3, the odds are 5 times the betting amount, and in round 4, the odds are 10 times the betting amount. On the other hand, the odds for option betting is 60 times the betting amount. These odds are only an example, and the present invention is not limited thereto. However, the odds increase as the round progresses, and the option betting preferably has the highest odds.

Figure 4:
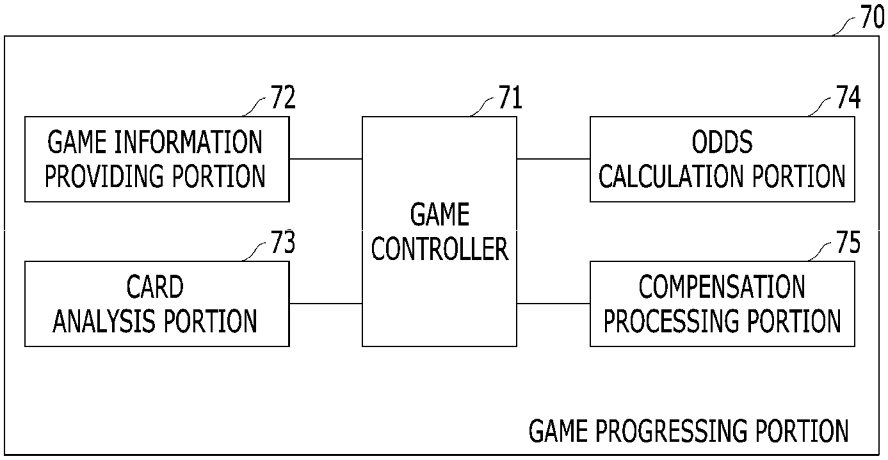
FIG. 4 is a block diagram showing the configuration of the game progressing portion of FIG. 2 in detail.

FIG. 4 is a block diagram illustrating the configuration of the game progressing portion of FIG. 2 in detail.

As shown in FIG. 4, the game progressing portion 70 may comprise a game controller 71, a game information providing portion 72, a card analysis portion 73, an odds calculation portion 74 and a compensation processing portion 75.

When a card game is played among a plurality of players, the game controller 71 may perform a control function required to perform m the card game, such as generating a player's betting amount and betting position, determining win or loss, and awarding a prize corresponding to the odds for each round and option betting.

The game information providing portion 72 provides the function of transmitting game information that needs to be delivered to the players (e.g., information on numbers, symbols or patterns of cards open in each round, betting amounts and positions of players, win or loss, odds and prize amounts for each round and option betting).

The card analysis portion 73 compares open card hands placed on the red side and blue side of the card placement zone 120 for each round to determine win or loss between the red side 120*a* and blue side 120*b* through a predetermined value ranking of the card hands.

For example, when the comparison target is the number, the card analysis portion 73 may determine a side having a card with a higher number as a win, and a side having a card with a lower number as a loss. Also, when the comparison target is the shape of a standard playing card, the card analyst portion73 may determine, in the order of ♠>♦>♥>♣ the side having a card with a higher ordered pattern as a win, and the side having a card with a lower ordered pattern as a loss. In this case, the cards used may be a standard playing card with a number and a symbol displayed on one side, but the present invention is not limited thereto, and any cards comprising four types of card hands that may be compared to determine win or loss may be used.

In addition, the card analysis portion 73 may determine that, if all four open card hands placed on each side of the card placement zone 120 are the same after the end of the game up to round 4, the option of the corresponding side is a win; and, if even any one of the four open card hands placed on each side is different, the option on the corresponding side is a loss.

For example, when deciding the option on the corresponding side, the four open card hands placed on the red side of the card placement zone 120 are compared, and, if all four open card hands placed on the red side are the same, the red option may be determined as a win, and, if all four open card hands placed on the red side are not identical, the red option may be determined as a loss. If the four open card hands placed on the blue side are compared and all four open card hands placed on the blue side are the same, the blue option may be determined as a win, and, if all four open card hands placed on the blue side are not identical, the blue option may be determined as a loss.

The odds calculation portion 74 calculates an award amount by applying the odds to the winning side determined by the card analysis portion 73, based on the predetermined odds for each round and option betting on the red and blue sides of the betting zone 110. The odds calculation portion 74 allows the rewards to be given in win or loss method using the numbers or patterns of the cards, and the odds are applied differently for each round. That is, the odds increase gradually towards the later rounds.

The compensation processing portion 75 rewards a player who bet on the winning side by using the prize amount calculated by the odds calculation portion 74. In the case of a player betting on the losing side in the round, the compensation processing portion 75 collects all game chips bet in all subsequent rounds including the losing round.

The operation of the system for providing the table-based card game service according to the present invention configured as described above will be described in detail with reference to the attached drawings. The same reference numerals as FIGS. 1 to 4 refer to the same members having the same functions.

Figure 5:
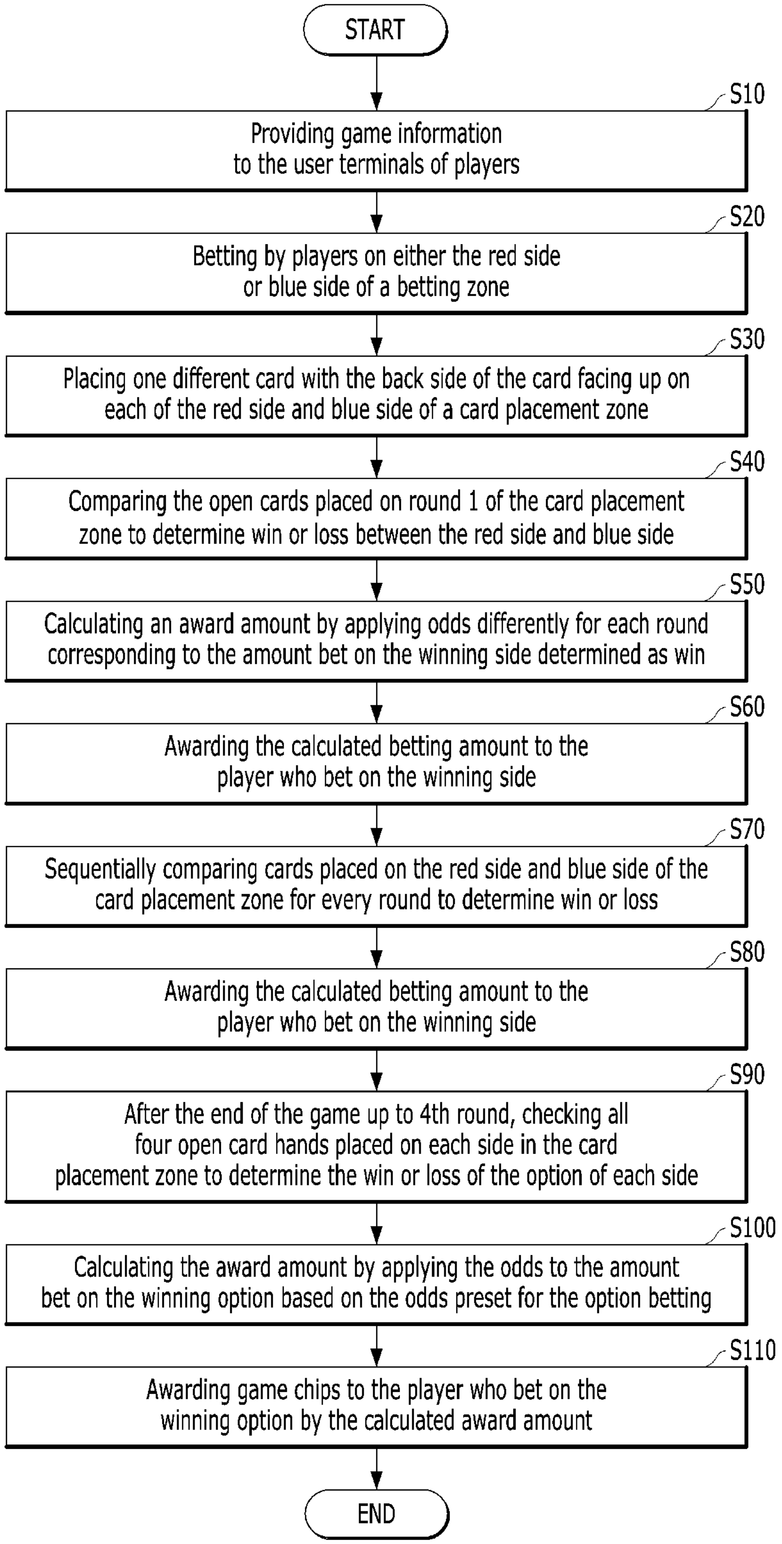
FIG. 5 is a flowchart illustrating a method for providing a table-based card game service according to an embodiment of the present invention.

FIG. 5 is a flowchart illustrating a method for providing a table-based card game service according to an embodiment of the present invention.

Referring to FIG. 5, when a card game is first performed by the game controller 71, game information is provided to the user terminal 10 of the player through the game information providing portion 72 S10. In this case, the game information may comprise information on numbers, symbols or patterns of cards opened in each round, betting amounts and positions of players, win or loss, odds and prize amounts for each round and option betting).

Subsequently, the game information providing portion 72 provides players connected to the management server 30 with a betting zone 110 comprising a pair of a red side and a blue side on which four zones from round 1 to round 4 and an option zone on top (i.e., top of round 4) are sequentially drawn; the players bet game chips on either the red side or blue side of the betting zone 110, and an option for each side is selected to bet the game chips S20.

When the betting of all players who want to play the game e are completed, the game controller 71 places one different card with the back side of the card facing up on each of the red side and blue side of the card placement zone 120 on which four zones from round 1 to round 4 are sequentially drawn S30.

Then, the card analysis portion 73 opens the cards placed on the red side and blue side placed in round 1 of the card placement zone 120 and compares the numbers or symbols displayed on the open cards to determine win or loss between the red side and blue side through a predetermined value ranking of card hands S40. That is, according to the results of the judgment, the win or loss of round 1 of the red side and blue side of the betting zone is determined.

The odds calculation portion 74 calculates an award amount by applying predetermined odds for each round corresponding to the game chips bet on the winning side determined as a win S50. In this case, the odds are applied differently for each round S50. That is, the odds increase gradually towards the later rounds.

A reward is given to a player who bet on the winning side S60. That is, the player who bet on the side determined to be a win is awarded by applying odds corresponding to the betting amount. On the other hand, in the case of a player betting on the losing side in the corresponding round, the compensation processing portion 75 collects all game chips bet in all subsequent rounds including the losing round (i.e., all game chips bet on the betting zone 110).

Meanwhile, the card game is played by the game controller 71 based on the presence or absence of game chips (betting status) placed in the betting zone 110, and the cards placed on the red side and blue side of the card placement zone 120 are sequentially compared for each round by the card analyst portion 73 to determine win or loss S70.

According to the results of the judgment, the odds calculation portion 74 calculates the award amount on the side determined as win for each round, and the compensation processing portion 75 awards game chips to the player who bet on the winning side for each round and collects all game chips bet in all subsequent rounds including the losing round from the player who bet on the losing side S80.

Subsequently, after the end of the game up to 4th round, the card analysis portion 73 checks whether or not all four open card hands placed on each side in the card placement zone are the same to determine the win or loss of the option of each side S90.

In addition, the odds calculation portion 74 calculates the award amount by applying the odds to the amount bet on the winning option determined by the card analysis portion 73 based on the odds preset for the option betting S100.

According to the results of the judgment, the odds calculation portion 74 calculates the award amount on the side determined as win for the option, and the compensation processing portion 75 awards game chips to the player who bet on the winning option and collects all game chips bet on the option from the player who bet on the losing option S110. As described above, the present invention allows a player to select a betting target and bet game chips thereon, and allows a four-round game to be played through a single process that a player selects a betting target and bets game chips, and the dealer shuffles and arranges cards, such that the game may be played quickly in a row. That is, the player may quickly play many games in a short period of time and, thus, may feel fun and interesting.

FIGS. 6A to 6E are diagrams illustrating a table-based card game process according to an embodiment of the present invention.

Figure 6A:
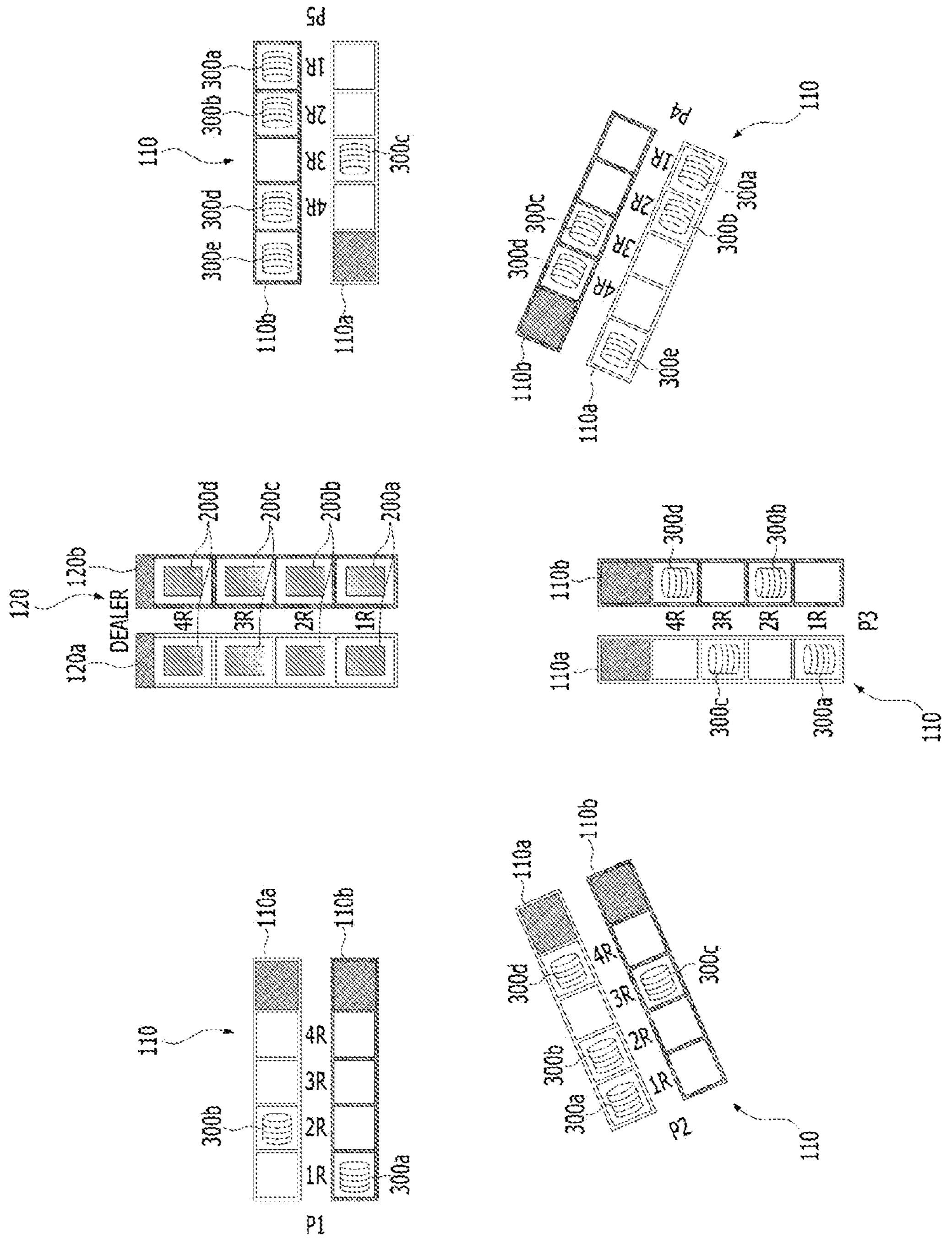
FIGS. 6A to 6E are diagrams illustrating a table-based card game process according to an embodiment of the present invention.

Referring to FIGS. 6A to 6E, as shown in FIG. 6A, players bet game chips corresponding to a certain amount of money on either the red side or the blue side for each round of the betting zone 110 displayed on their user terminals 10 connected to the management server 30. At this time, the betting amount needs to be the same for each round, and betting needs to be made sequentially starting from round 1, and betting may be made for at least two rounds and up to four rounds. Apart from the round-by-round betting, the players may bet on the option positioned at the top of round 4. The option betting is made for an option game in which additional betting may be made separately from the game of rounds consisting of round 1 to round 4 during the card game, and if all open card hands placed on the red side (round 1 to 4) or the blue side (round 1 to 4) are the same, the game chips are awarded according to the odds for the option betting.

Subsequently, when the betting of the players is completed, the game controller 71 of the game progressing portion 70 collectively deals eight cards such that one different card is placed on each of the red side and blue side of the card placement zone 120. That is, the game controller 71 places one different card with the back side of the card facing up on each of the red side 120*a* and the blue side 120*b* of round 1 to round 4 200*a* to 200*d* of the card placement zone 120.

For example, when five players (P1 to P5) bet game chips, the first player P1 bets on the blue side 110*b* in round 1 300*a* and on the red side 110*a* in round 2 300*b*. That is, the first player P1 bets only in rounds 1 and 2, i.e., two rounds that is the minimum number of betting rounds. The second player P2 bets on the red side 110*a* in round 1 300*a*, round 2 300*b*, and round 4 300*d*, and bets on the blue side 110*b* in round 3 300*c*. That is, the second player P2 bets in rounds 1 to 4. Also, the third player P3 bets on the red side 110*a* in round 1 300*a* and round 3 300*c*, respectively, and bets on the blue side 110*b* in round 2 300*b* and round 4 300*d*, respectively. That is, the third player P3 bets in rounds 1 to 4. The fourth player P4 bets on the red side 110*a* in round 1 300*a* and round 2 300*b*, respectively, and bets on the blue side 110*b* in round 3 300*c* and round 4 300*d*, respectively, and further bets on the option of the red side 110*a*. That is, the fourth player P4 bets from rounds 1 to 4, and additionally bets on the option of the red side 110*a*. The fifth player P5 bets on the red side 110*a* in round 3 300*c*, and bets on the blue side 110*b* in round 1 300*a*, round 2 300*b*, and round 4 300*d*, respectively, and further bets on the option of the blue side 110*b*. That is, the fifth player P5 bets from rounds 1 to 4, and further made bets on the option of the blue side 110*b*.

Figure 6B:
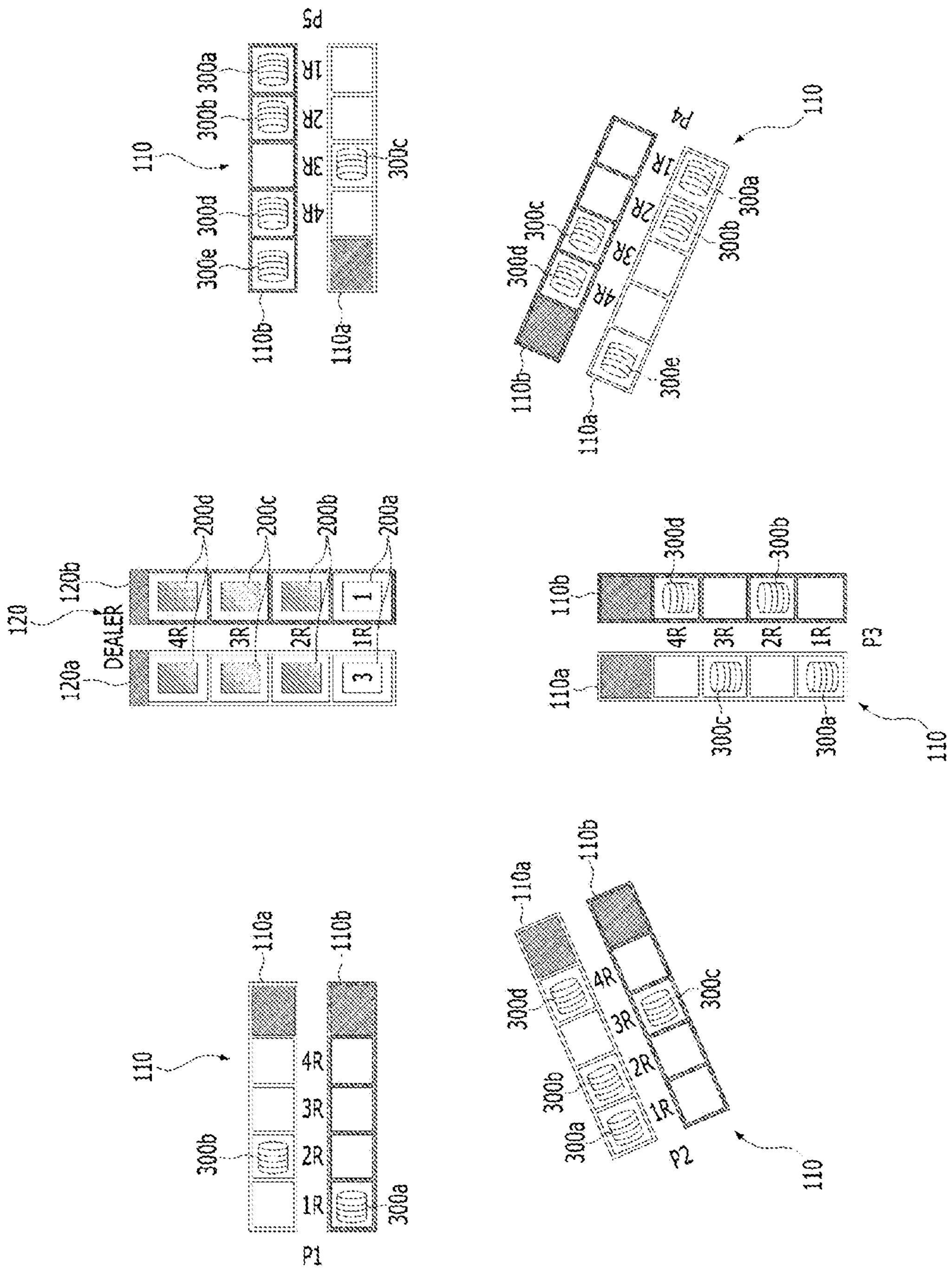

Subsequently, as shown in FIG. 6B, when each round and option bet by the players (P1 to P5) are completed, the game controller 71 of the game progressing portion 70 proceeds to deal four cards to the red side and four cards to the blue side of the card placement zone 120, and then turn over the cards placed on round 1 200*a* of the red side 120*a* and blue side

120*b* to expose the numbers or symbols to the outside. Also, the card analysis portion 73 of the game progressing portion 70 may compare the numbers or symbols displayed on the cards placed on round 1 200*a* to determine win or loss between the red side 120*a* and the blue side 120*b* through a predetermined value ranking of the card hands.

In the case of FIG. 6B, the number of the card placed on round 1 200*a* of the red side 120*a* of the card placement zone 120 is 3, and the number of the card placed on round 1 200*a* of the blue side 120*b* is 1. Therefore, the red side 120*a* is a win, and the blue side 120*b* is a loss.

Since the red side 120*a* wins according to the results of comparison of the cards in round 1 200*a*, the second, third, and fourth players P2, P3, P4 who bet on the red side 110*a* in round 1 300*a* of the betting zone 110 become winners; and the first and fifth players P1, P5 who bet on the blue side 110*b* in round 1 300*a* of the betting zone 110 become loser.

Accordingly, the odds calculation portion 74 of the game progressing portion 70 awards game chips to the winning second, third, and fourth players P2, P3, P4 corresponding to the odds for round 1 based on the betting amount, and all game chips for all rounds (all game chips bet in the betting zones 110*a*, 110*b*) bet by the losing first and fifth players P1, P5 are collected.

As described above, game chips placed in all subsequent rounds including the losing round are collected from the losing player. Also, the winning player may be awarded game chips corresponding to odds for the round and may play the game on the next round. In such case, the game can be continued to the next round only when game chips were placed to bet for the next round at the time of initial betting.

The betting award rate increases as round progresses. That is, the odds for round 1 are 1 time the betting amount, the odds for round 2 are 2 times of the betting amount, the odds for round 3 are 5 times of the betting amount, and the odds for round 4 are 10 times of the betting amount. In the case of the option betting, the odds are 60 times the betting amount.

As such, as the odds increase towards the later rounds, the player becomes more motivated to play the game in the next round. However, if losing in the round, the player needs to make a good judgement because the game chips bet on all rounds are collected. Even if the player loses in round 2, the game chips awarded for winning in round 1 are not collected, and only the game chips bet for the later rounds including the corresponding round can be collected.

Accordingly, as the first player P1 and the fifth player P5 lost in the first round, the game chips bet in all rounds will be collected, and, as the second, third, and fourth players P2, P3, P4 won in round 1, they will be awarded game chips corresponding to the bet game chips by 1 time as the odds for round 1.

Subsequently, the game controller 71 of the game progressing portion 70 turns over the cards placed on round 2 200*b* of the red side 120*a* and the blue side 120*b* of the card placement zone 120 to expose the numbers or symbols to the outside. Also, the card analysis portion 73 of the game progressing portion 70 may compare the numbers or symbols displayed on the cards placed on round 2 200*b* to determine win or loss between the red side 120*a* and the blue side 120*b* through a predetermined value ranking of the card hands.

Figure 6C:
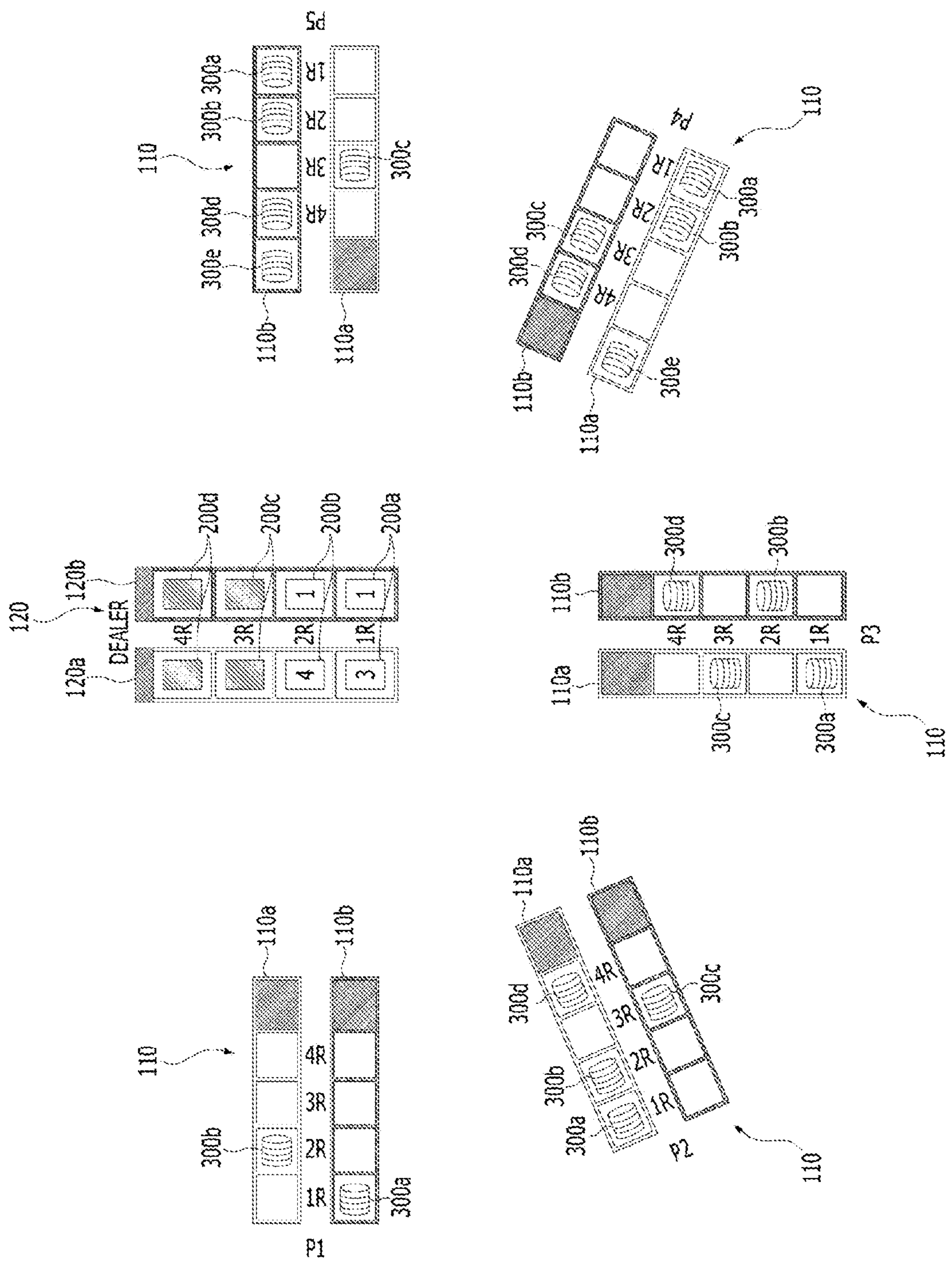

In FIG. 6C, the number of the card placed on round 2 200*b* of the red side 120*a* of the card placement zone 120 is 4, and the number of the card placed on round 2 200*b* of the blue side 120*b* is 1. Therefore, the red side 120*a* is a win, and the blue side 120*b* is a loss.

As the red side 120*a* won according to the results of comparison of the cards in round 2 200*b*, the second and fourth players P2, P4 who bet on the red side 110*a* in round 2 300*b* of the betting zone 110 become winners, and the third player P3 who bet on the blue side 110*b* becomes a loser.

Accordingly, the odds calculation portion 74 of the game progressing portion 70 awards the winning second and fourth players P2, P4 game chips corresponding to the odds for round 2 based on the betting amount, and all game chips bet in rounds 2, 3, and 4 (all game chips bet in the betting zones 110*a*, 110*b*) bet by the losing third player P3 are collected. That is, as the second and fourth players P2, P4 won in round 2, they will be awarded game chips corresponding to the bet game chips by 2 times as the odds for round 2.

Accordingly, the game proceeds to the next round for the winners (i.e., the second and fourth players P2, P4, and the fifth player P5), and the game ends for the loser (i.e., the third player P3).

Subsequently, the game controller 71 of the game progressing portion 70 turns over the cards placed on round 3 200*c* of the red side 120*a* and the blue side 120*b* of the card placement zone 120 to expose the numbers or symbols to the outside. Also, the card analysis portion 73 of the game progressing portion 70 may compare the numbers or symbols displayed on the cards placed on round 3 200*c* to determine win or loss between the red side 120*a* and the blue side 120*b* through a predetermined value ranking of the card cards.

Figure 6D:
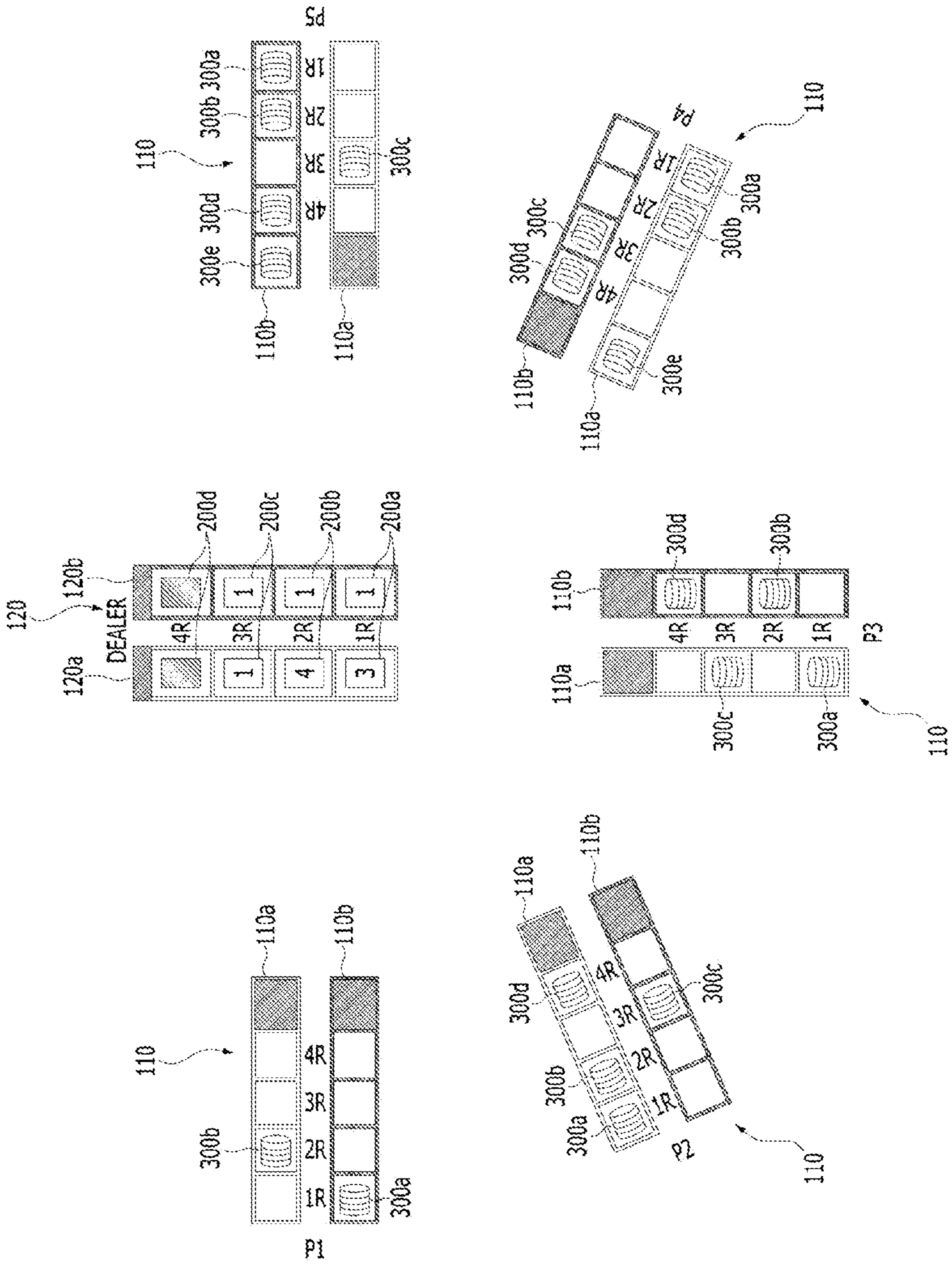

In FIG. 6D, the number of the card placed on round 3 200*c* of the red side 120*a* of the card placement zone 120 is 1, and the number of the card placed on round 3 200*c* of the blue side 120*b* is also 1. Therefore, the red side 120*a* and the blue side 120*b* are tied (TIE).

As the result of comparison of the cards in round 3 200*c* becomes a draw (TIE), all players take the game chips they bet without award or collection, and the next round may proceed. In this way, if the comparison of the card hands results in a tie (TIE), the dealer passes the game to the next round without determining win or loss.

Therefore, the second and fourth players P2, P4 and the fifth player P5 may play the game in the next round. Next, the game controller 71 of the game progress portion 70 turns over the cards placed on round 4 200*d* of the red side 120*a* and the blue side 120*b* of the card placement zone 120 to expose the numbers or symbols to the outside. Then, the card analysis portion 73 of the game progressing portion 70 may compare the numbers or symbols displayed on the cards placed on round 4 200*d* to determine win or loss between the red side 120*a* and the blue side 120*b* through a predetermined value ranking of the card hands.

Figure 6E:
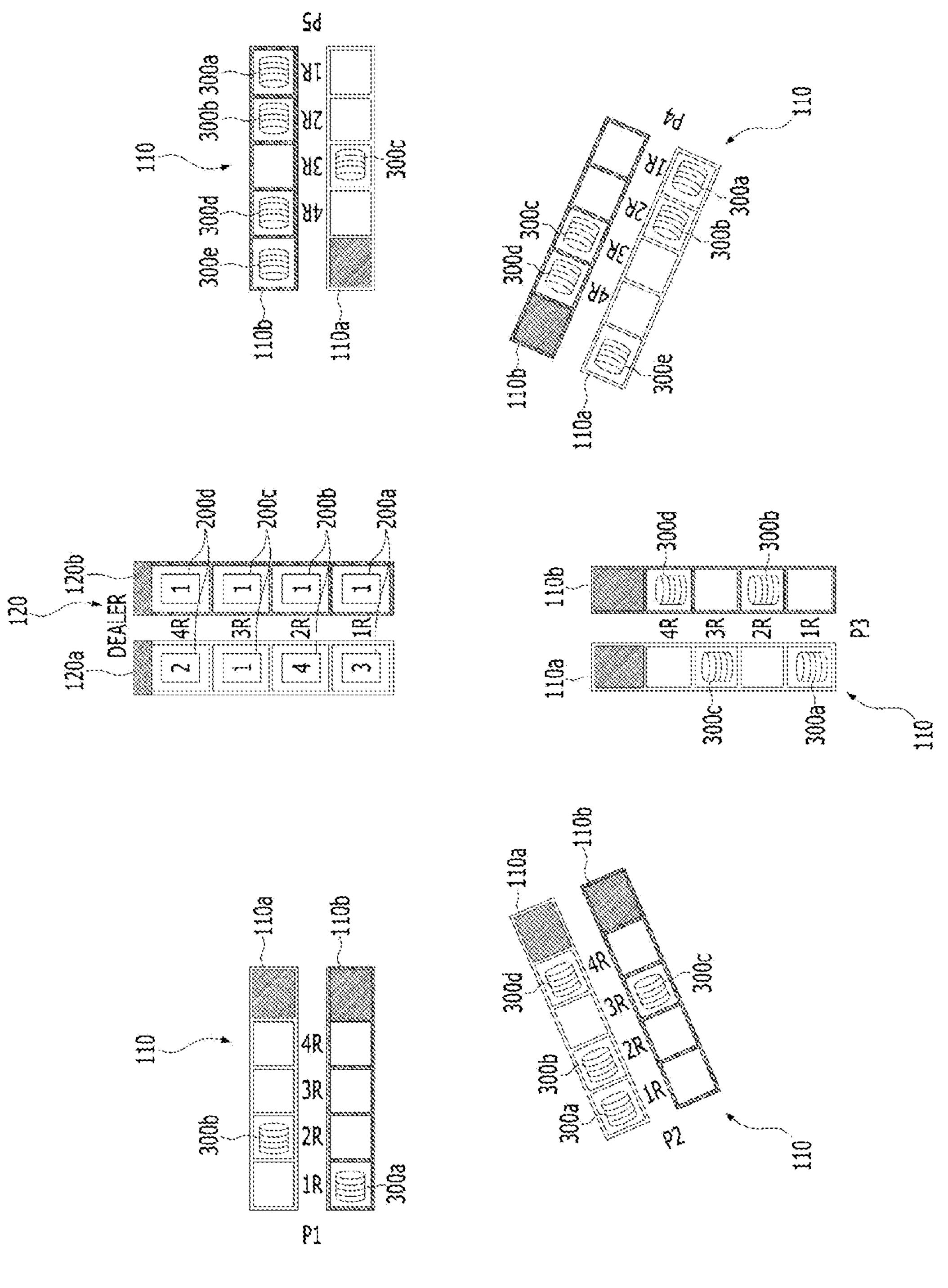

In FIG. 6E, the number of the card placed on round 4 200*d* of the red side 120*a* of the card placement zone 120 is 2, and the number of the card placed on round 4 200*d* of the blue side 120*b* is 1. Therefore, the red side 120*a* is a win, and the blue side 120*b* is a loss.

As the red side 120*a* wins according to the results of comparison of the cards in round 4 200*d*, the second player P2 who bet on the red side 110*a* in round 4 300*d* of the betting zone 110 becomes a winner, and the fourth player P4 who bet on the blue side 110*b* of round 4 300*d* of the betting zone 110 becomes a loser.

Accordingly, the odds calculation portion 74 of the game progressing portion 70 awards to the winning second player P2 game chips corresponding to the odds for round 4 based on the betting amount, and the game chips for round 4 bet by the losing fourth player P4 are collected. That is, as the second player P2 wins round 4, they will be awarded game chips corresponding to the bet game chips by 10 times as the odds for round 4.

Next, the game controller 71 of the game progressing portion 70 may check whether or not all four card hands exposed to the red side 120*a* of the card placement zone 120 are the same to determine the win or loss of the option of the red side 110*a*, and check whether or not all four card hands exposed to the blue side 120*b* of the card placement zone 120 are the same to determine the win or loss of the option of the blue side 110*b*.

That is, when game chips are bet on the option of the red side option and the option of the blue side of the betting zone according to the player's choice, and all four open card hands placed on each side of the card placement zone are the same after the end of the game up to round 4, the option of the corresponding side is determined as a win, and if any one of the four open card hands placed on each side is different, the option of the corresponding side is determined as a loss.

Therefore, since the number of all cards opened in all rounds of the blue side 110*b* of the card placement zone 120 is the same as 1, the option of the blue side is determined s a win, and the game chips are awarded to the fifth player P5 who bet on the option of the blue side 110*b* according to the odds for the option betting based on the betting amount. That is, as the option of the blue side 110*b* wins, the fifth player P5 will be awarded game chips corresponding to the game chips bet on the option of the blue side 110*b* by 60 times as the odds for the option bet.

On the other hand, since the numbers of the open cards on the red side 110*a* of the card placement zone 120 are 3, 4, 1, and 2 and, thus, are different from one another, the fourth player P4 who bet on the option of the red side 110*a* becomes a loser, and, therefore, the game chips bet on the option of the red side 110*a* by the fourth player P4 are collected.

When the prize money is paid and the collection of the bet game chips are completed according to the win or loss decision of the option game, the game ends, and the next game may be played by shuffling the cards through the game controller 71 of the game progressing portion 70.

As such, the option zone is an area in which a player may select and bet game chips for an option game in which additional betting may be made separately from the game of rounds consisting of round 1 to round 4 during the card game.

As described above, the present invention allows a four-round game to be played through a single process that a player selects a betting target and bets game chips, and the dealer shuffles and arranges cards, such that the game may be played quickly in a row. That is, the player may quickly play many games in a short period of time.

Meanwhile, the device according to the described embodiments may comprise a processor, a memory for storing and executing program data, a permanent storage such as a disk drive, a communication port for communicating with an external device, a user interface device such as a touch panel, a key and a button, etc. Methods implemented by software modules or algorithms may be stored on a computer-readable recording medium as computer-readable codes or program commands executable on the processor. The computer-readable recording medium may comprise magnetic storage media (e.g., read-only memory (ROM), random-access memory (RAM), floppy disks and hard disks) and optical reading media (e.g., CD-ROM, and DVD (Digital Versatile Disc). The computer-readable recording medium may be distributed across network-connected computer systems, and computer-readable codes may be stored and executed in a distributed manner. The medium may be readable by a computer, stored in a memory and executed by a processor.

All documents comprising publications, patent applications and patents cited in the disclosed embodiments may be incorporated into the disclosed embodiments in the same way that each cited document is individually and specifically incorporated for the cited documents are collectively incorporated into the disclosed embodiment.

For understanding of the disclosed embodiments, reference numerals have been used for preferred embodiments shown in the drawings, and certain terms have been used to describe the disclosed embodiments. However, the disclosed embodiments are not limited by specific terms and may comprise all components commonly conceived by those skilled in the art.

The disclosed embodiments may be presented by functional blocks and various processing steps. These functional blocks may be implemented as a plurality of hardware or/and software components that perform specific functions. For example, the disclosed embodiments may employ integrated circuit configurations such as memory, processing, logic, look-up tables, etc., that may perform various functions by means of the control of one or more microprocessors or other control devices. Similar to the components of the disclosed embodiments that may be implemented as software programming or software elements, the disclosed embodiments may be implemented in a programming or scripting language such as C, C++, Java and assembler, comprising various algorithms implemented as combinations of data structures, processes, routines or other programming constructs. Functional aspects may be implemented as an algorithm executed on one or more processors. In addition, the disclosed embodiments may employ conventional techniques for electronic environment setting, signal processing and/or data processing. Terms such as "mechanism", "element," "means" and "composition" may be used broadly and are not limited to mechanical and physical components. The term may comprise the meaning of a series of routines of a software in association with a processor, etc.

Certain executions described in the disclosed embodiments are examples and do not limit the scope of the disclosed embodiments in any way. For simplicity of the specification of the present invention, description of conventional electronic components, control systems, software, and other functional aspects of the systems may be omitted. In addition, the connection of lines or connecting members between the components shown in the drawings exemplify functional connections and/or physical or circuit connections, which, in actual devices, may be presented as a variety of alternative or additional functional, physical, or circuit connections. In addition, if such terms as "essential" and "important" are not employed, the components may not necessarily be required for application of the disclosed embodiments.

Moreover, those having ordinary skill in the technical field of the present invention will be able to understand that various embodiments may be practiced within the scope of the technical idea of the present invention. Therefore, the scope of the present invention for which technical protection is sought should be determined by the technical idea of the claims as attached.

DESCRIPTION OF NUMERALS

10: User terminal
20: Wired/wireless communication network

30: Management server
50: Controller
60: User information storage portion
70: Game progressing portion
71: Game controller
72: Game information providing portion
73: Card analysis portion
74: Odds calculation portion
75: Compensation processing portion
100: Game table
110: Betting zone
120: Card placement zone
A: Dealer position zone
B: Game player position zone

The invention claimed is:

1. A system for providing a table-based card game service comprising: a controller that controls overall functions of the game comprising game start, preparation and end; a user information storage portion that stores user game information for each of a plurality of users registered to receive the card game service; and a game progressing portion that actually executes the card game in the game room generated in the controller and provides information related to game progressing to the controller, wherein the game progressing portion comprises:

a game controller that performs control functions required to perform the card game, e.g., generating a player's betting amount and betting position, determining win or loss, and awarding a prize corresponding to odds for each round and option betting, when the card game is played among a plurality of players;

a game information providing portion that provides the function of transmitting game information that needs to be delivered to the player (e.g., information on numbers, symbols or patterns of cards opened in each round, betting amounts and positions of players, win or loss, odds and prize amounts for each round and option betting);

a card analysis portion that compares the open card hands placed for each round on a pair of a red side and a blue side on which four zones from the 1st round to the 4th round of the card placement zone are sequentially drawn, and judges win or loss between the red side and blue side through the predetermined value ranking of the card hands and, after the end of the game up to the 4th round, checks whether or not all four open card hands placed on each side in the card placement zone are the same to determine the win or loss of the option of each side;

an odds calculation portion that calculates the award amount by applying the odds to the amount bet on the winning side determined by the card analysis portion based on the odds preset for each round, and calculates the award amount by applying the odds to the amount bet on the winning option based on the odds preset for the option betting; and a compensation processing portion that rewards a player who bet on the winning side in the round, collects all game chips bet in all subsequent rounds including the losing round from a player who bet on the losing side in the round, rewards a player who bet on the winning option and collects all game chips bet in all subsequent rounds including the losing round from a player who bet on the losing option.

2. The system for providing a table-based card game service of claim 1, wherein the cards placed on the red side and blue side of the card placement zone for every round are sequentially compared to determine win or loss.

3. The system for providing a table-based card game service of claim 1, wherein, after the end of the game up to 4th round, the card analysis portion may determine that, if all four open card hands placed on each side of the card placement zone are the same, the option of the corresponding side is win, and, if any one of the four open card hands placed on each side is different from others, the option of the corresponding side is loss.

4. The system for providing a table-based card game service of claim 1, wherein the odds increase gradually towards the later rounds.

5. A method for providing a table-based card game service, the method comprising:

(A) providing the game information to the user terminals of the players through the game information providing portion when the card game is performed by the game controller;

(B) providing, by the game information providing portion, a betting zone comprising a pair of a red side and a blue side on which four zones from round 1 to round 4 and an option zone on top (i.e., top of round 4) are sequentially drawn, to players connected to the management server, and betting game chips on either the red side or blue side of the betting zone and selecting the option of each side to bet the game chips;

(C) when the betting is completed, placing, by the game controller, one different card with the back side of the card facing up on each of the red side and blue side of a card placement zone on which four zones from round 1 to round 4 are sequentially drawn;

(D) opening, by the card analyst portion, the cards placed on round 1 of each of the red side and blue side of the card placement zone, comparing the numbers or symbols displayed on the open cards to determine win or loss between the red side and blue side through a predetermined value ranking of the card hands; and, after the end of the game up to round 4, and checking whether or not all four open card hands placed on each side of the card placement zone are the same to determine win or loss of the option of each side;

(E) calculating, by the odds calculation portion, an award amount by applying the odds preset for each round corresponding to the amount bet on the round determined as win, and calculating an award amount by applying the odds preset for the option betting corresponding to the amount bet on the option determined as win;

(F) awarding, by the compensation processing portion, a player who bet on the winning side by using the calculated award amount;

(G) playing, by the game controller, the card game based on the presence or absence of the game chips in the betting zone (based on whether or not the betting is made), and sequentially comparing, through the card analyst portion, the cards placed on the red side and blue side of the card placement zone for every round to determine win or loss; and (H) determining the win or loss of the red side and blue side of the betting zone according to the results of determination in step (G) and repeating steps (E) and (F).

6. The method for providing a table-based card game service of claim 5, wherein step (F) comprises the steps of rewarding a player who bet on the winning side in the round, and, if the red side and blue side are a draw in the round, returning the amount bet on the round to the player; and collecting all game chips bet in all subsequent rounds including the losing round from a player who bet on the losing side in the round; and rewarding a player who bet on the winning option and collecting the betting chips from a player who bet on the losing option.

* * * * *